(12) United States Patent
Zhao

(10) Patent No.: US 11,832,240 B2
(45) Date of Patent: Nov. 28, 2023

(54) METHOD AND DEVICE FOR SIDELINK COMMUNICATION

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 321 days.

(21) Appl. No.: 17/278,857

(22) PCT Filed: Sep. 26, 2018

(86) PCT No.: PCT/CN2018/107730
§ 371 (c)(1),
(2) Date: Mar. 23, 2021

(87) PCT Pub. No.: WO2020/061848
PCT Pub. Date: Apr. 2, 2020

(65) Prior Publication Data
US 2022/0039114 A1    Feb. 3, 2022

(51) Int. Cl.
*H04W 72/1263*  (2023.01)
*H04W 24/08*  (2009.01)
*H04W 72/044*  (2023.01)
*H04W 92/18*  (2009.01)

(52) U.S. Cl.
CPC ....... *H04W 72/1263* (2013.01); *H04W 24/08* (2013.01); *H04W 72/044* (2013.01); *H04W 92/18* (2013.01)

(58) Field of Classification Search
CPC ............ H04W 72/1263; H04W 24/08; H04W 72/044; H04W 92/18
See application file for complete search history.

(56) References Cited

U.S. PATENT DOCUMENTS

| | | | | |
|---|---|---|---|---|
| 2020/0344034 | A1* | 10/2020 | Moon | H04W 28/20 |
| 2021/0058940 | A1* | 2/2021 | Choi | H04W 72/12 |
| 2021/0352623 | A1* | 11/2021 | Wang | H04W 72/0453 |
| 2022/0312484 | A1* | 9/2022 | Murray | H04W 74/002 |

FOREIGN PATENT DOCUMENTS

WO    WO 2018084571 A1    5/2018

OTHER PUBLICATIONS

International Search Report in International Application No. PCT/CN/2018107730, dated Apr. 28, 2019.

* cited by examiner

*Primary Examiner* — Chae S Lee
(74) *Attorney, Agent, or Firm* — Finnegan, Henderson, Farabow, Garrett & Dunner, L.L.P

(57) ABSTRACT

The present disclosure provides a method for sidelink communication, including: performing operation on scheduling information in a first bandwidth part, wherein the scheduling information is used for scheduling data in a second bandwidth part; and performing operation on the data in the second bandwidth part.

14 Claims, 4 Drawing Sheets

METHOD AND DEVICE FOR SIDELINK COMMUNICATION

CROSS REFERENCE TO RELATED APPLICATIONS

This application is a national phase application based on International Application No. PCT/CN2018/107730, filed Sep. 26, 2018, the content of which is incorporated herein by reference.

TECHNICAL FIELD

The present disclosure relates to a field of communication technologies, specifically to a method for sidelink communication, a device for sidelink communication, an electronic device, and a computer-readable storage medium.

BACKGROUND

Internet of vehicles (such as vehicle to everything, V2x) includes V2V (vehicle to vehicle), V2I (vehicle to infrastructure) and V2P (vehicle to pedestrian). By supporting the communication between on-board devices (such as V2V), between on-board devices and roadside devices (such as V2I), and between on-board devices and handheld devices (such as V2P), the Internet of vehicles can effectively improve traffic safety, improve traffic efficiency and enrich people's travel experience.

In LTE-(long term evolution)-based Internet of vehicles, the sidelink communication (such as sidelink) between devices only supports some basic safety services of the Internet of vehicles, including BSM (basic safety messages), such as CAM (cooperative awareness messages) or DENM (decentralized environmental notification messages), which may be broadcasted by voice.

With the development of 5G (5th Generation) NR (new radio) technologies, in order to adapt to 5G scenarios, applications required and supported by the sidelink communication of the Internet of vehicles need to be expanded. For example, in addition to the above-mentioned two services, vehicles platooning, extended sensors, advanced driving, and remote driving are required to be supported. More types of sidelink communication raise requirements to communication delay and power consumption.

In the 5G NR technology, the concept of BWP (bandwidth part) is introduced. User equipment (UE) can be configured with multiple BWPs and can switch between BWPs. In the process of the sidelink communication, the UE needs to receive scheduling information, send and receive data on a certain BWP. However, according to the way of receiving the scheduling information, sending and receiving the data in related art, the communication delay and power consumption are large, which is not conducive to the sidelink communication of the UE in a variety of business scenarios.

SUMMARY

Accordingly, embodiments of the present disclosure provide a method for sidelink communication, a device for sidelink communication, an electronic device and a computer-readable storage medium.

According to a first aspect of embodiments of the present disclosure, there is provided a method for sidelink communication, applicable to user equipment (UE) for communicating through a sidelink. The method includes: operating scheduling information on a first bandwidth part, the scheduling information being configured to schedule data located on a second bandwidth part; and operating the data on a second bandwidth part.

According to a second aspect of embodiments of the present disclosure, there is provided a device for sidelink communication, applicable to user equipment (UE) for communicating through a sidelink. The device includes:

a scheduling operating module, configured to operate scheduling information on a first bandwidth part, the scheduling information being configured to schedule data located in a second bandwidth part; and a data operating module, configured to operate the data on the second bandwidth part.

According to a third aspect of embodiments of the present disclosure, there is provided an electronic device. The electronic device includes:

a processor;

a memory, configured to store instructions executable by the processor;

in which the processor is configured to execute steps of a method for sidelink communication according to the first aspect described above.

According to a fourth aspect of embodiments of the present disclosure, there is provided a computer-readable storage medium, having computer programs stored thereon. When the program is executed by a processor, steps of a method for sidelink communication according to the first aspect described above are executed.

BRIEF DESCRIPTION OF THE DRAWINGS

In order to clearly illustrate the technical solution according to embodiments of the present disclosure, the drawings needed in describing the embodiments will be introduced below. It is obvious that the drawings in the description below are merely some embodiments of the present disclosure. For the skilled person in the art, other drawings may be obtained based on these drawings without any creative labor.

DETAILED DESCRIPTION

The technical solutions according to embodiments of the present disclosure will be described clearly and completely in combination with the drawings according to embodiments of the present disclosure. It is obvious that the described embodiments are merely a part of embodiments of the present disclosure, not all of embodiments. Based on embodiments of the present disclosure, all other embodiments obtained by the skilled person in the art without any inventive labors belong to the protection scope of the present disclosure.

Figure 1:
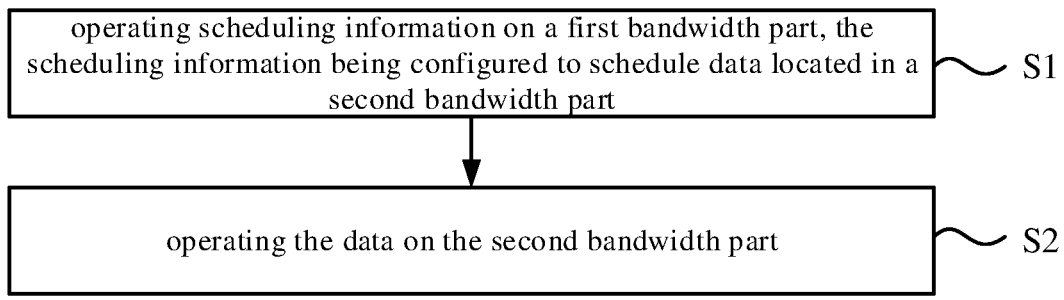
FIG. 1 is a schematic flowchart illustrating a method for sidelink communication according to embodiments of the present disclosure.

FIG. 1 is a schematic flowchart illustrating a method for sidelink communication according to embodiments of the present disclosure. The method according to embodiments of the present disclosure can be applied to user equipment (UE). The UE can carry out the sidelink communication based on 5G (5th Generation) NR (new radio) technologies. The sidelink communication refers to the communication between a UE and another UE. The UE may be an on-board device, a handheld device, a roadside device, and the like.

As illustrated in FIG. 1, the method for sidelink communication may include the following.

In step S1, scheduling information (such as scheduling assignment, referred to as SA) may be operated on a first bandwidth part. The scheduling information may be configured to schedule data that is located in a second bandwidth part. For a carrier corresponding to a service cell, the carrier can be portraited into multiple segments having different bandwidths, and each segment is a bandwidth part.

In step S2, the data is operated on the second bandwidth part.

In an embodiment, the UE may be configured with multiple bandwidth parts. For example, the UE may be configured with at least the first bandwidth part and the second bandwidth part. The UE can receive and send the scheduling information on the first bandwidth part, and receive and send the data on the second bandwidth part.

For example, the UE A may send the scheduling information to the UE B on the first bandwidth part. The UE B can receive the scheduling information on the first bandwidth part to determine the data that which time-frequency resource of the second bandwidth part is scheduled by the scheduling information by parsing the scheduling information, and further receive, on the second bandwidth part, the data corresponding to the time frequency resource.

The bandwidth part on which the UE operates the scheduling information may be different from the bandwidth part on which the UE operates the data. Bandwidths corresponding to different bandwidth parts may be different, which is convenient for the UE to select bandwidth parts having appropriate bandwidths from configured bandwidth parts as the first bandwidth part and the second bandwidth part according to actual needs.

For example, the data volume of the scheduling information that the UE needs to receive is generally less than the data volume of the data scheduled by the scheduling information. Therefore, the bandwidth required for receiving or sending the data is larger than that required for receiving or sending the scheduling information.

In related art, the UE is configured to receive the scheduling information and receive the data scheduled by the scheduling information on the same bandwidth part. Only a bandwidth part having a smaller bandwidth is required to receive the scheduling information. To receive the data, a bandwidth part having a larger bandwidth needs to be configured, which causes the UE to monitor the bandwidth part having the larger bandwidth to receive the scheduling information. The power consumption and the time delay of monitoring the bandwidth part having the larger bandwidth is larger than those of monitoring the bandwidth part having the smaller bandwidth.

According to embodiments of the present disclosure, the scheduling information can be received on the first bandwidth part, and the data scheduled by the scheduling information can be received on the second bandwidth part. The first bandwidth part is different from the second bandwidth part. For example, the bandwidth part with the smaller bandwidth may be selected as the first bandwidth part, and the bandwidth part with the larger bandwidth may be selected as the second bandwidth part, so as to reduce the time delay and the power consumption of operating the scheduling information by the UE while satisfying a basis that sufficient bandwidth is used to operate the data, which is conducive to satisfying the sidelink communication of UE in multiple service scenarios.

Optionally, the bandwidth of the first bandwidth part is smaller than the bandwidth of the second bandwidth part.

In an embodiment, since in most cases, the data volume of the scheduling information that needs to be received by the UE is less than the data volume of the data scheduled by the scheduling information, the bandwidth required for receiving or sending the data by the UE is larger compared with the bandwidth required for receiving or sending the scheduling information. Therefore, the bandwidth part with the smaller bandwidth can be selected as the first bandwidth part, and the bandwidth part with the larger bandwidth can be selected as the second bandwidth part. The time delay and the power consumption of operating the scheduling information by the UE may be reduced while satisfying a basis that sufficient bandwidth is used to operate the data.

Figure 2:
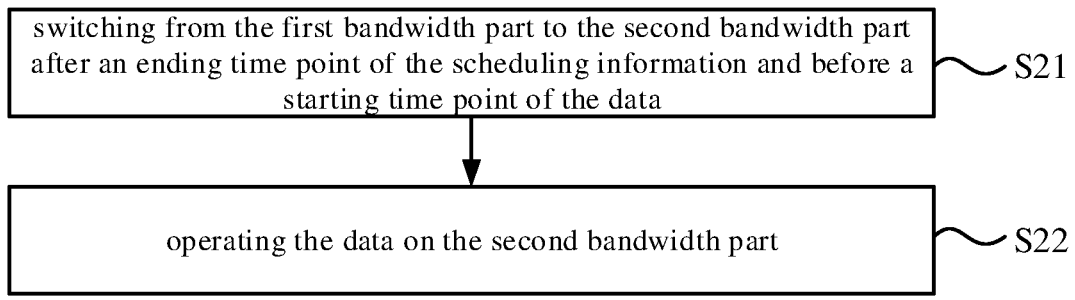
FIG. 2 is a schematic flowchart illustrating that data is operated on a second bandwidth part according to embodiments of the present disclosure.

FIG. 2 is a schematic flowchart illustrating that data is operated on the second bandwidth part according to embodiments of the present disclosure. As illustrated in FIG. 2, an ending time point of the scheduling information is before a starting time point of the data, and operating the data on the second bandwidth part includes the following.

In step S21, after the ending time point of the scheduling information and before the starting time point of the data, the first bandwidth part is switched to the second bandwidth part.

In step S22, the data is performed on the second bandwidth part.

In an embodiment, the bandwidth part used by the UE may be called as active bandwidth part. For a cell, there may be only one active bandwidth part at a time. For example, when the UE operates the scheduling information on the first bandwidth part, the first bandwidth part is the active bandwidth part. When the UE operates the scheduling information on the second bandwidth part, the second bandwidth part is the active bandwidth part. From the first bandwidth part being the active bandwidth part to the second bandwidth part being the active bandwidth part, the UE needs to switch from the first bandwidth part to the second bandwidth part.

Since a target bandwidth part (i.e., the second bandwidth part) of the switching operation is determined according to the scheduling information, the switching operation needs to be performed after the ending time point of the scheduling information. In addition, since the data needs to be operated after the first bandwidth part is switched to the second bandwidth part, the switching operation needs to be completed before the starting time point of the data to ensure complete data reception.

Figure 3:
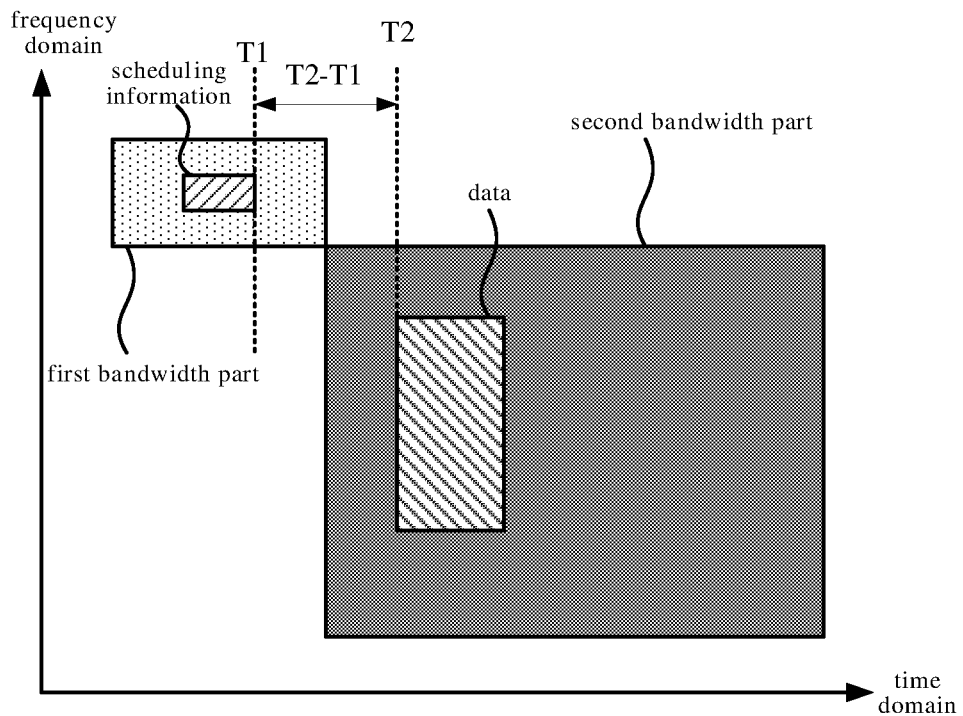
FIG. 3 is a schematic diagram illustrating a time difference according to embodiments of the present disclosure.

FIG. 3 is a schematic diagram illustrating a time difference according to embodiments of the present disclosure.

As illustrated in FIG. 2, optionally, the time difference (T2−T1) between the ending time point T1 of the scheduling information and the starting time point T2 of the data is greater than or equal to a preset duration.

The preset duration is negatively correlated to a velocity of switching from the first bandwidth part to the second bandwidth part by the UE operating the scheduling information and the data.

In an embodiment, the user equipment may take a period of time to switch from the first bandwidth part to the second bandwidth part. For example, the period of time is the preset duration. This duration is negatively correlated to the velocity of switching from the first bandwidth part to the second bandwidth part by the UE. That is, the faster the velocity, the shorter the preset duration can be set, the slower the velocity, the longer the preset duration can be set. The velocity may be related to the bandwidth of the first bandwidth part and the bandwidth of the second bandwidth part, or may be related to the performance of the UE itself, which can be specifically obtained through a test in advance. In a case where the time difference (T2−T1) is greater than or equal to the preset duration, the completion of the switching operation from the first bandwidth part to the second bandwidth part may be ensured after the ending time point T1 of the scheduling information and before the starting time point T2 of the data.

It should be noted that the first bandwidth part and the second bandwidth part can be illustrated in FIG. 3 in the frequency domain, and there is no bandwidth overlap of the bandwidth parts. In some embodiments, some bandwidth overlaps of the two bandwidth parts can be set as needed.

Optionally, the operating may include sending and/or receiving.

Optionally, the operating may include sending and receiving. The first bandwidth part on which the scheduling information is sent is the same with or different from the first bandwidth part on which the scheduling information is received, and/or the second bandwidth part on which the data is sent is the same with or different from the second bandwidth part on which the data is received.

In an embodiment, for a UE, the first bandwidth part on which the UE sends the scheduling information may be the same with or different from the first bandwidth part on which the UE receives the scheduling information. The second bandwidth part on which the UE sends data may be the same with or different from the second bandwidth part on which the UE receives the data.

For example, the UE is configured with 4 BWPs, namely BWP1, BWP2, BWP3 and BWP4.

If the first bandwidth part on the UE sends the scheduling information is different from the first bandwidth part on which the UE receives the scheduling information, any one of the four BWPs can be selected to receive the scheduling information, and any one of the four BWPs can be selected to receive the scheduling information. There is no need to ensure that the two selected BWPs are the same.

Accordingly, it is convenient for the UE to flexibly select the bandwidth parts having appropriate bandwidths as needed to receive and send scheduling information, as well as to receive and send data.

If the first bandwidth part on which the UE sends the scheduling information is the same with the first bandwidth part on which the UE receives the scheduling information, and if the BWP1 is selected from the 4 BWPs to receive the scheduling information, the BWP1 needs to be selected for sending the scheduling information.

In addition, for the BWP corresponding to an operation (such as receiving), the BWP of the corresponding operation (such as sending) can also be configured. The two BWPs can be the same or different. For example, the first bandwidth part where the UE receives the scheduling information is BWP1, then the first bandwidth part where the UE sends the scheduling information can be configured as BWP2. In this case, the UE receives the scheduling information through the BWP1, and sends the scheduling information through the BWP2. For example, the first bandwidth part where the UE receives the scheduling information is BWP3, then the first bandwidth part where the UE sends the scheduling information can be configured as BWP3. In this case, the UE receives the scheduling information through the BWP3, and sends scheduling information through the BWP3.

Figure 4:
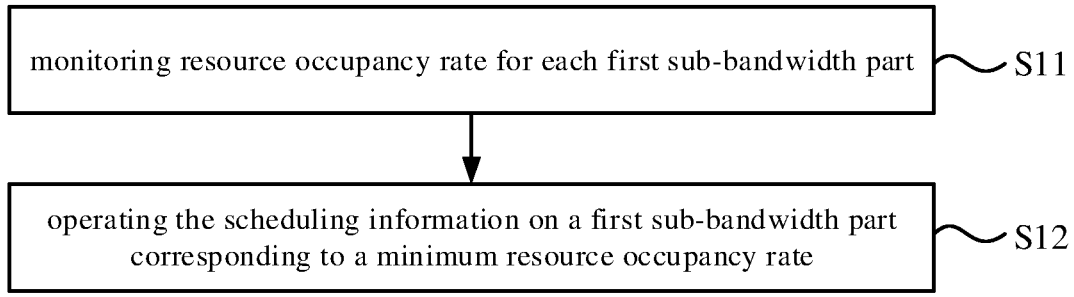
FIG. 4 is a schematic flowchart illustrating that scheduling information is operated on a first bandwidth part according to embodiments of the present disclosure.

FIG. 4 is a schematic flowchart illustrating that scheduling information is operated on the first bandwidth part according to embodiments of the present disclosure. As illustrated in FIG. 4, the first bandwidth part includes a plurality of first sub-bandwidth parts, and operating the scheduling information on the first bandwidth part includes the following.

In step S11, a resource occupancy rate is monitored for each first sub-bandwidth part.

In step S12, the scheduling information is operated on the first sub-bandwidth part corresponding to a minimum resource occupancy rate.

In an embodiment, the resource occupancy rate (such as channel busy ratio, CBR) can be determined in the following manner. For a time-frequency resource block in a certain first sub-bandwidth part, the received energy is monitored. If this energy is greater than a pre-determined energy threshold, the time-frequency resource block is defined as busy. The proportion of the busy time-frequency resource block to all time-frequency resource blocks in the first sub-bandwidth part may be determined within a preset time period, and the proportion is the resource occupation rate. The lower the resource occupancy rate, the lower the communication delay of the bandwidth part.

For some UEs which may be half-duplex UEs, either receiving or sending can be performed at a time. When these UEs are configured with multiple first sub-bandwidth parts, the first sub-bandwidth part corresponding to the lowest occupancy rate may be selected to receive or send the scheduling information, so as to reduce the time delay of receiving or sending the scheduling information by the UE.

Optionally, the first bandwidth parts where the multiple UEs initially operate the scheduling information are the same.

In an embodiment, although the first bandwidth parts configured for the UEs can be changed, the first bandwidth parts where the scheduling information is initially operated can be configured to be the same for the UEs. Since the sidelink communication is between a UE and another UE, by configuring the first bandwidth parts where multiple UEs initially operate the scheduling information to be the same, it can be ensured that the UEs can transmit and receive the scheduling information on the same bandwidth part when the scheduling information is sent and received between the UEs, thereby ensuring the successful transmission of the scheduling information.

Figure 5:
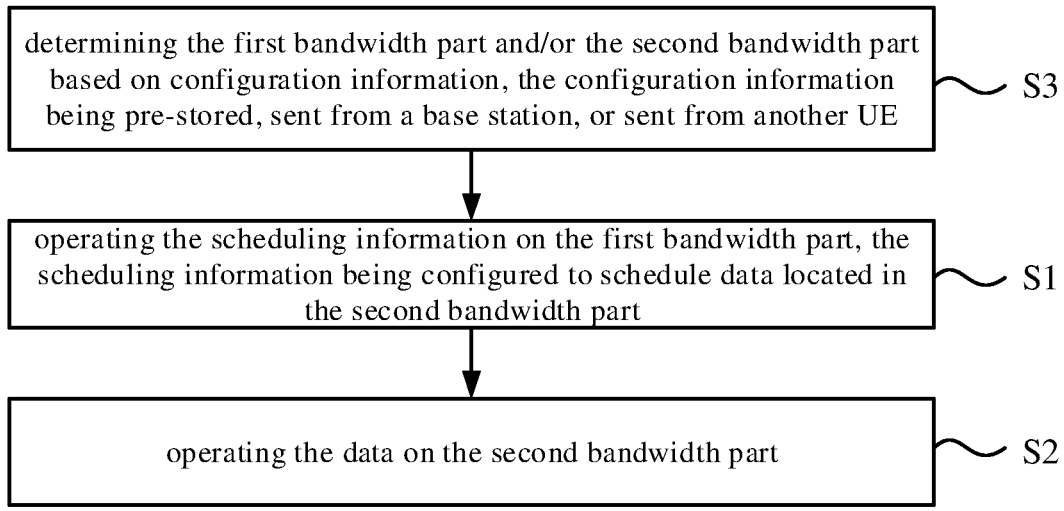
FIG. 5 is a schematic flowchart illustrating another method for sidelink communication according to embodiments of the present disclosure.

FIG. 5 is a schematic flowchart illustrating another method for sidelink communication according to embodiments of the present disclosure. As illustrated in FIG. 5, the method may further include the following.

In step S3, the first bandwidth part and/or the second bandwidth part are determined based on configuration information. The configuration information may be pre-stored, sent from a base station, or sent from another UE.

In an embodiment, the UE may pre-store the configuration information. The pre-stored configuration information may be configured to indicate the first bandwidth part on which the UE operates the scheduling information and indicate the second bandwidth part on which the UE operates the data.

In an embodiment, the UE may receive the configuration information sent from the base station. The configuration information sent from the base station may indicate the first bandwidth part on which the UE operates the scheduling information, and may indicate the second bandwidth part on which the UE operates the data.

In an embodiment, the UE may receive the configuration information sent from another UE (for example through the physical synchronization broadcast channel PBSCH). For example, other UEs may be monitored on a default BWP (for example the first bandwidth part where the scheduling information is initially operated) when idle (for example no operation is performed on the scheduling information or the data). The configuration information sent from another UE can indicate the first bandwidth part on which the UE operates the scheduling information, and may indicate the second bandwidth part on which the UE operates on the data.

It should be noted that when the configuration information sent from another UE is received, the configuration information can be verified. For example, it is verified whether the identity of the UE sending the configuration information is legal or not (for example whether the identity of the user equipment belongs to a pre-stored identity set or not). In a case that the identity is legal, the first bandwidth part and/or the second bandwidth part are determined based on the configuration information sent from another UE. Accordingly, the security of the first bandwidth part and/or the second bandwidth part may be ensured.

Optionally, in a plurality of the UEs, the first bandwidth part for a preset UE is a preset first bandwidth part, and/or the second bandwidth part for the preset UE is a preset second bandwidth part.

In an embodiment, since services performed by a UE can be determined (for example, the UE may perform unicast, multicast (multicasting), broadcast, etc.), the first bandwidth part and/or the second bandwidth part required by the UE can be determined based on the services. On a basis of this, a specific first bandwidth part (i.e., the preset first bandwidth part) and/or a specific second bandwidth part (i.e., the preset second bandwidth part) may be set for the UE which is the preset user equipment. Therefore, the UE may keep operating the scheduling information on the preset first bandwidth part and/or operating the data on the preset second bandwidth part, without frequently changing the bandwidth parts by the UE, thereby reducing the power consumption of UE.

Corresponding to the foregoing embodiment of the method for sidelink communication, the present disclosure also provides embodiments related to a device for sidelink communication.

Figure 6:
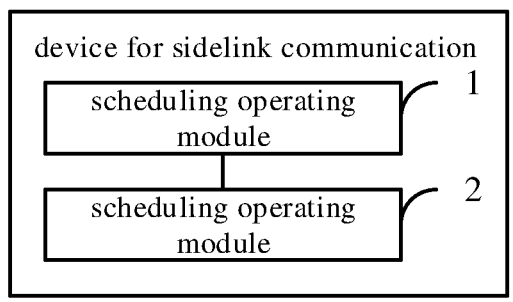
FIG. 6 is a schematic block diagram illustrating a device for sidelink communication according to embodiments of the present disclosure.

FIG. 6 is a schematic block diagram illustrating a device for sidelink communication according to embodiments of the present disclosure. The method according to embodiments may be applied to user equipment (UE). The UE may be configured perform a sidelink communication based on 5G NR technology. The sidelink communication refers to the communication between a UE and another UE. The UE may be an on-board device, a handheld device, and a roadside device.

As illustrated in FIG. 6, the device for sidelink communication may include a scheduling operating module 1 and a data operating module 2.

The scheduling operating module 1 is configured to operate scheduling information on a first bandwidth part. The scheduling information may be configured to schedule data that is located in a second bandwidth part.

The data operating module 2 is configured to operate the data on the second bandwidth part.

Optionally, a bandwidth of the first bandwidth part is less than a bandwidth of the second bandwidth part.

Figure 7:
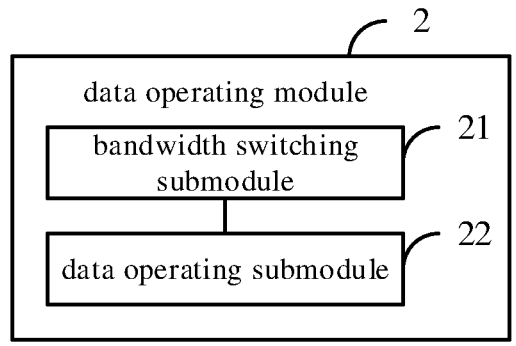
FIG. 7 is a schematic block diagram illustrating a data operating module according to embodiments of the present disclosure.

FIG. 7 is a schematic block diagram illustrating a data operating module according to embodiments of the present disclosure. As illustrated in FIG. 7, an ending time point of the scheduling information is before a starting time point of the data. The data operating module 2 includes a bandwidth switching submodule 21 and a data operating submodule 22.

The bandwidth switching submodule 21 is configured to switch from the first bandwidth part to the second bandwidth part after the ending time point of the scheduling information and before the starting time point of the data.

The data operating submodule 22 is configured to operate the data on the second bandwidth part.

Optionally, a time difference between the ending time point of the scheduling information and the starting time point of the data is greater than or equal to a preset duration.

The preset duration is negatively correlated to a velocity of switching from the first bandwidth part to the second bandwidth part by the UE operating the scheduling information and the data.

Optionally, the operating includes sending and/or receiving.

Optionally, the operating includes sending and receiving, the first bandwidth part on which the scheduling information is sent is the same with or different from the first bandwidth part on which the scheduling information is received, and/or a second bandwidth part on which the data is sent is the same with or different from the second bandwidth part on which the data is received.

Figure 8:
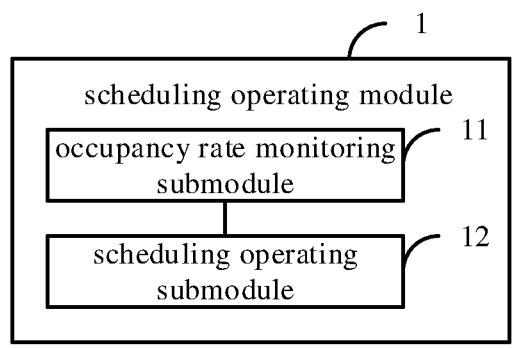
FIG. 8 is a schematic block diagram illustrating a scheduling operating module according to embodiments of the present disclosure.

FIG. 8 is a schematic block diagram illustrating a scheduling operating module according to embodiments of the present disclosure. As illustrated in FIG. 8, the first bandwidth part includes a plurality of first sub-bandwidth parts. The scheduling operating module 1 includes an occupancy rate monitoring submodule 11 and a scheduling operating submodule 12.

The occupancy rate monitoring submodule 11 is configured to monitor a resource occupancy rate for each sub-bandwidth part.

The scheduling operating submodule 12 is configured to operate the scheduling information on a first sub-bandwidth part corresponding to a minimum resource occupancy rate.

Optionally, the first bandwidth parts on which a plurality of UEs initially operate the scheduling information are the same.

Figure 9:
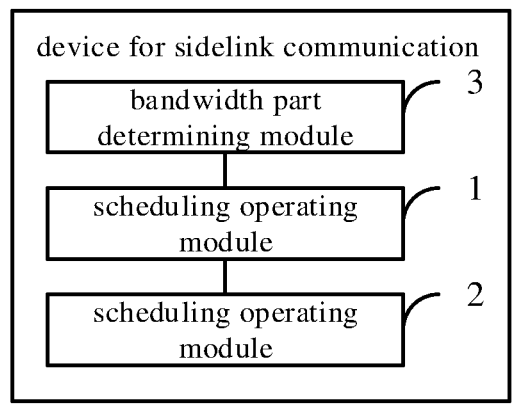
FIG. 9 is a schematic block diagram illustrating another device for sidelink communication according to embodiments of the present disclosure.

FIG. 9 is a schematic block diagram illustrating another device for sidelink communication according to embodiments of the present disclosure. As illustrated in FIG. 9, the device may include a bandwidth part determining module 3.

The bandwidth part determining module 3 is configured to determine the first bandwidth part and/or the second bandwidth part based on configuration information. The configuration information is pre-stored, sent from a base station, or sent from another UE.

Optionally, in a plurality of UEs, the first bandwidth part for a preset UE is a preset first bandwidth part, and/or the second bandwidth part for a preset UE is a preset second bandwidth part.

Regarding to the device according to embodiments of the present disclosure, the specific implementation of each module has been already described in detail in the method embodiments, which is not illustrated herein.

For the device embodiments, since it basically corresponds to the method embodiments, descriptions of the method embodiment can be referred to for relevant parts. The device embodiments described above are only schematic, in which the units described as separate components may or may not be physically separated, and the components displayed as units may or may not be physical units, that is, they may be located in one place or distributed to multiple network units. Some or all of the modules can be selected according to the actual needs to achieve the purpose of the embodiments. Ordinary technicians in the art can understand and implement the embodiments without paying creative labor.

Embodiments of the present disclosure further provide an electronic device. The electronic device includes:

a processor and a memory is configured to store instructions executable by the processor.

The processor is configured to execute steps of a method for sidelink communication according to any one of embodiments described above.

Embodiments of the present disclosure further provide a computer-readable storage medium, having computer programs stored thereon. When the program is executed by a processor, steps of a method for sidelink communication according to any one of embodiments described above are executed.

Figure 10:
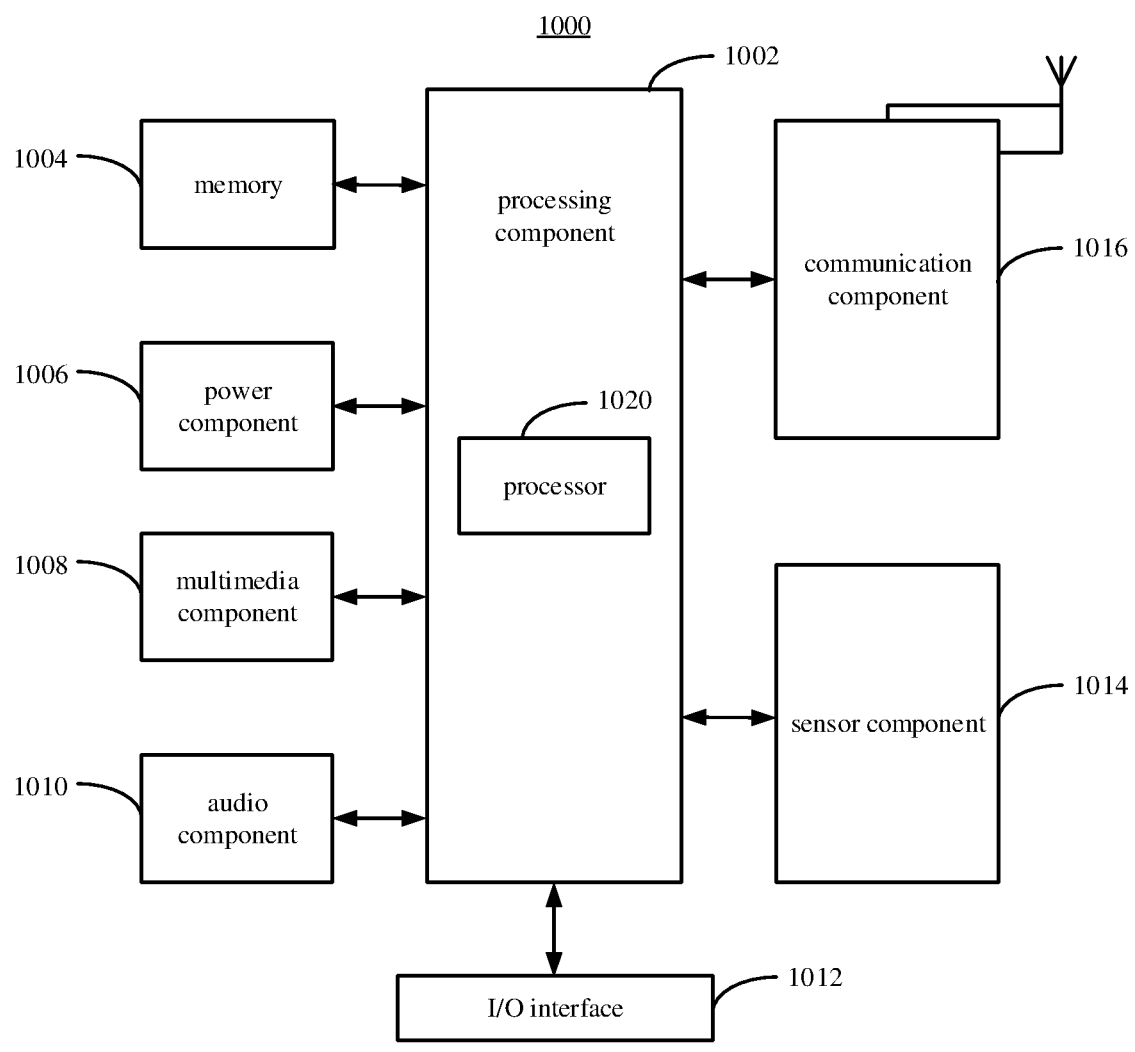
FIG. 10 is a schematic block diagram illustrating a device used for sidelink communication according to embodiments of the present disclosure.

FIG. 10 is a schematic block diagram illustrating a device 1000 used for sidelink communication according to embodiments of the present disclosure. For example, the device 1000 may be a mobile phone, a computer, a digital broadcasting terminal, a message receiving and sending device, a game console, a tablet device, a medical device, a fitness device, and a personal digital assistant, etc.

As illustrated in FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. When the device 1000 is in an operation mode, such as in a shooting mode or a video mode, the front camera and/or the rear camera receives external multimedia data. Each front camera and rear camera can be a fixed optical lens system or have focal length and optical zoom capabilities.

The audio component 1010 is configured to output and/or input audio signals. For example, the audio component 1010 includes a microphone ("MIC") configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 may detect an open/closed status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 can access a wireless network based on a communication standard, such as WiFi, 2G, or 3G, or a combination thereof. In one exemplary embodiment, the communication component 1016 receives a broadcast signal or broadcast associated information from an external broadcast management system via a broadcast channel In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1004, executable by the processor 1020 in the device 1000, for performing the above-described methods. For example, the non-transitory computer-readable storage medium may be a ROM, a RAM, a CD-ROM, a magnetic tape, a floppy disc, an optical data storage device, and the like.

Those skilled in the art easily think of other embodiments of the present disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are indicated by the claims.

It should be understood that the present disclosure is not limited to the precise structure that has been described above and shown in the drawings, and various modifications and changes can be made without departing from the scope thereof. The scope of the present disclosure is limited only by the appended claims.

It should be noted that in the description, relational terms such as first and second are only used to distinguish an entity or operation from another, and do not necessarily require or imply any such actual relationship or order between these entities or operations. The terms "include", "comprise" or any other variation thereof are intended to cover non-exclusive inclusion, so that a process, method, article or device that includes a series of elements includes not only those elements, but also other elements that are not explicitly listed, or elements inherent in such process, method, article or device. Without further restrictions, an element defined by the phrase "includes a . . . " does not exclude the existence of other identical elements in the process, method, article or equipment including the elements.

The method and device according to embodiments of the present disclosure are described in detail above. In the description, specific examples are applied to describe the principles and implementations of the present disclosure. The description of the above embodiment is only used to understand the method and core idea of the present disclosure. Moreover, for the ordinary skilled person in the art, based on the idea of the present disclosure, the specific implementations and application scopes may be changed. In conclusion, the content of the description should not be interpreted as a limitation of the present disclosure.

What is claimed is:

1. A method for sidelink communication, applicable to user equipment (UE) communicating through a sidelink, the method comprising:
    operating scheduling information on a first bandwidth part, the scheduling information being configured to schedule data located in a second bandwidth part, wherein an ending time point of the scheduling information is before a starting time point of the data;
    switching from the first bandwidth part to the second bandwidth part after the ending time point of the scheduling information and before the starting time point of the data; and
    operating the data on the second bandwidth part;
    wherein the first bandwidth part is the same first bandwidth part on which a plurality of UEs initially operate the scheduling information;
    wherein a time difference between the ending time point of the scheduling information and the starting time point of the data is greater than or equal to a preset duration, and the preset duration is negatively correlated to a velocity of switching from the first bandwidth part to the second bandwidth part by the UE operating the scheduling information and the data.

2. The method according to claim 1, wherein a bandwidth of the first bandwidth part is less than a bandwidth of the second bandwidth part.

3. The method according to claim 1, wherein operating the scheduling information comprises at least one of sending the scheduling information or receiving the scheduling information, and operating the data comprises at least one of sending the data or receiving the data.

4. The method according to claim 3, wherein the first bandwidth part on which the scheduling information is sent is the same with or different from the first bandwidth part on which the scheduling information is received, and the second bandwidth part on which the data is sent is the same with or different from the second bandwidth part on which the data is received.

5. The method according to claim 1, wherein the first bandwidth part comprises a plurality of first sub-bandwidth parts, and operating the scheduling information on the first bandwidth part comprises:
    monitoring a resource occupancy rate for each sub-bandwidth part; and
    operating the scheduling information on a first sub-bandwidth part corresponding to a minimum resource occupancy rate.

6. The method according to claim 1, further comprising:
    determining at least one of the first bandwidth part or the second bandwidth part based on configuration information, wherein the configuration information is pre-stored, sent from a base station, or sent from another UE.

7. The method according to claim 6, wherein, in a plurality of UEs, the first bandwidth part for a preset UE is a preset first bandwidth part, and/or the second bandwidth part for a preset UE is a preset second bandwidth part.

8. User equipment (UE) communicating through a sidelink, comprising:
- a processor; and
- a memory configured to store instructions executable by the processor;
- wherein the processor is configured to:
- operate scheduling information on a first bandwidth part, the scheduling information being configured to schedule data located in a second bandwidth part, wherein an ending time point of the scheduling information is before a starting time point of the data;
- switch from the first bandwidth part to the second bandwidth part after the ending time point of the scheduling information and before the starting time point of the data; and
- operate the data on the second bandwidth part,
- wherein the first bandwidth part is the same first bandwidth part on which a plurality of UEs initially operate the scheduling information;
- wherein a time difference between the ending time point of the scheduling information and the starting time point of the data is greater than or equal to a preset duration, and the preset duration is negatively correlated to a velocity of switching from the first bandwidth part to the second bandwidth part by the UE operating the scheduling information and the data.

9. A non-transitory computer readable storage medium, having computer programs stored thereon, wherein when the computer programs are executed by a processor of user equipment (UE), the UE is caused to perform a method for sidelink communication, the method comprising:
- operating scheduling information on a first bandwidth part, the scheduling information being configured to schedule data located in a second bandwidth part, wherein an ending time point of the scheduling information is before a starting time point of the data;
- switching from the first bandwidth part to the second bandwidth part after the ending time point of the scheduling information and before the starting time point of the data; and
- operating the data on the second bandwidth part,
- wherein the first bandwidth part is the same first bandwidth part on which a plurality of UEs initially operate the scheduling information;
- wherein a time difference between the ending time point of the scheduling information and the starting time point of the data is greater than or equal to a preset duration, and the preset duration is negatively correlated to a velocity of switching from the first bandwidth part to the second bandwidth part by the UE operating the scheduling information and the data.

10. The UE according to claim 8, wherein a bandwidth of the first bandwidth part is less than a bandwidth of the second bandwidth part.

11. The UE according to claim 8, wherein the first bandwidth part on which the scheduling information is sent is the same with or different from the first bandwidth part on which the scheduling information is received, and the second bandwidth part on which the data is sent is the same with or different from the second bandwidth part on which the data is received.

12. The UE according to claim 8, wherein the first bandwidth part comprises a plurality of first sub-bandwidth parts, and the processor is further configured to:
- monitor a resource occupancy rate for each sub-bandwidth part; and
- operate the scheduling information on a first sub-bandwidth part corresponding to a minimum resource occupancy rate.

13. The UE according to claim 8, wherein the processor is further configured to:
- determine at least one of the first bandwidth part or the second bandwidth part based on configuration information, wherein the configuration information is pre-stored, sent from a base station, or sent from another UE.

14. The UE according to claim 13, wherein, in a plurality of UEs, the first bandwidth part for a preset UE is a preset first bandwidth part, and/or the second bandwidth part for a preset UE is a preset second bandwidth part.

* * * * *